United States Patent Office 3,212,998
Patented Oct. 19, 1965

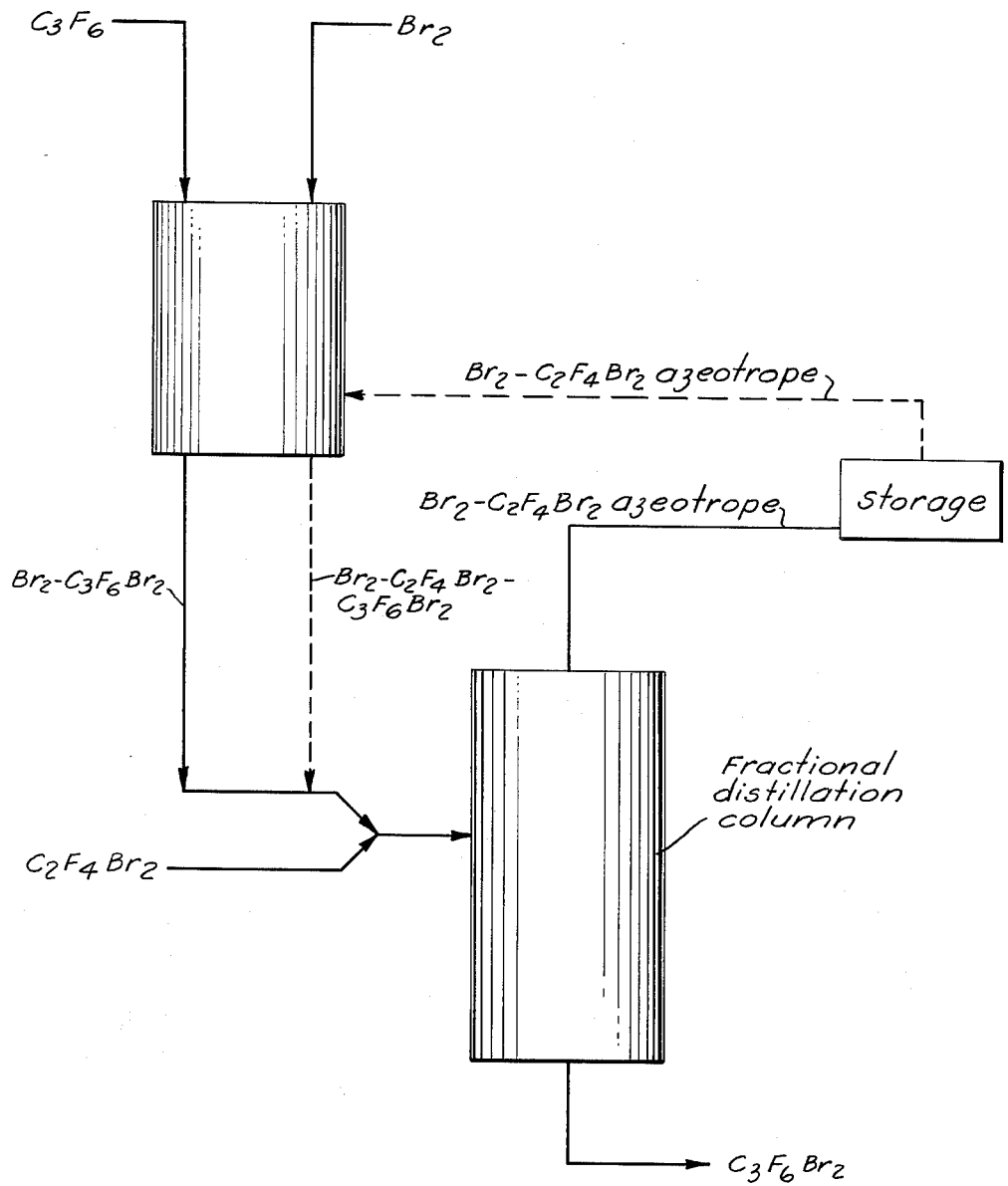

3,212,998
AZEOTROPIC DISTILLATION OF BROMINE
Arthur C. Doumas, Lake Jackson, Tex., assignor to The Dow Chemical Company, Midland, Mich., a corporation of Delaware
Filed Dec. 6, 1962, Ser. No. 242,640
2 Claims. (Cl. 202—42)

This invention relates to a new composition of matter and more particularly to a novel azeotrope of bromine and 1,2-dibromotetrafluoroethane ($C_2F_4Br_2$) and to a process for its use.

The novel composition of the present invention comprises on a weight basis about 29.8 weight percent bromine and about 70.2 weight percent 1,2-dibromotetrafluoroethane. The composition is a dark brown, mobile liquid having a boiling point of about 43° C. at standard conditions of temperature and pressure.

The composition conveniently is prepared by adding a predetermined amount of bromine to 1,2-dibromotetrafluoroethane in a suitable reaction vessel wherein the composition is adjusted so that the bromine content of the resulting product is about 29.8% by weight.

This product as produced can be stored or utilized as a bromine carrier or reaction medium for bromine in liquid and/or vapor phase.

The novel azeotrope composition of the present invention has a pronounced utility in the purification of 1,2-dibromohexafluoropropane ($C_3F_6Br_2$) by selectively removing free bromine therefrom. This composition also provides for direct recycle of the separated bromine values back to the reaction system for subsequent reaction in the preparation of additional $C_3F_6Br_2$.

The schematic flow diagram of the figure illustrates one embodiment of the invention as employed in the purification of 1,2-dibromohexafluoropropane.

The known art for separating bromine from 1,2-dibromohexafluoropropane, when these two components are both present in a reaction product mixture, teaches washing the mixture with a dilute caustic solution until the organic phase becomes colorless. In order to recover the bromine values from the caustic solution, this solution must be neutralized with acid and then heated to flash off the bromine. The so-recovered bromine then must be dried before it can be recycled to the reaction system. On a commercial scale, such a purification procedure requires considerable quantities of reactants extraneous to the prime reaction process as well as requires an excessive number of procedural operations.

Conventional fractional distillation of the product mixture to separate the bromine and dibromohexafluoropropane product is achieved only with difficulty because of the relatively small difference in boiling points between the two components, i.e. about 11.4° C.; ($Br_2$ has a normal boiling point of about 58.8° C. and $C_3F_6Br_2$ has a normal boiling point of about 70.2° C).

Now unexpectedly it has been found that if the novel azeotropic composition of the present invention is utilized in the fractionation of bromine-1,2-dibromotetrafluoropropane mixtures, ready fractionation is achieved because the boiling point difference between the heavier and lighter components is about 27.2° C.

In the purification of 1,2-dibromohexafluoropropane by use of the novel bromine-1,2-dibromotetrafluoroethane composition, the composition is generated directly in the reaction medium. To illustrate, predetermined amounts of 1,2-dibromotetrafluoroethane are added at a temperature below about 43° centigrade at normal pressure to a reaction product mixture containing bromine and the dibromohexafluoropropane sufficient that the bromine-dibromotetrafluoroethane components are present in weight proportions of about 29.8:70.2.

The resulting mixture is then fractionally distilled at a temperature of less than 70.2° C. at normal pressure with substantially pure azeotrope ($Br_2$–$C_2F_4Br_2$) being the overhead distillate (normal boiling point about 43° C.) and the bottoms being substantially pure $C_3F_6Br_2$ (normal boiling point of about 70.2° C.). The overhead azeotrope stream can be recycled directly back to the reaction system for contact of the separated bromine with additional hexafluoropropylene to prepare more $C_3F_6Br_2$. No pretreatment or purification of the azeotrope composition is needed before recycle as the $C_2F_4Br_2$ does not react with the hexafluoropropylene and the novel azeotrope overhead stream requires no drying before recycle.

Various modifications can be made in the present invention without departing from the spirit or scope thereof for it is understood that I limit myself only as defined in the appended claims.

I claim:

1. A process for removing bromine from a mixture of bromine and 1,2-dibromohexafluoropropane which comprises:
    (a) adding a predetermined quantity of 1,2-dibromotetrafluoroethane to a mixture of bromine and 1,2-dibromohexafluoropropane at a temperature of less than about 43° C. at normal pressure conditions, said quantity of said 1,2-dibromotetrafluoroethane being sufficient to provide in the resulting system a mixture of about 29.8 parts by weight bromine and about 70.2 parts by weight 1,2-dibromotetrafluoroethane,
    (b) fractionally distilling the resulting, 1,2-dibromohexafluoropropane - 1,2 - dibromotetrafluoroethane-bromine reaction mixture thereby to recover an azeotrope mixture at a maximum temperature of less than 70.2° C. at normal pressure conditions of 29.8 parts by weight bromine—70.2 parts by weight 1,2-dibromotetrafluoroethane as the overhead stream and substantially pure 1,2-dibromohexafluoropropane as the bottoms from said distillation.

2. The process as defined in claim 1 and including the step of recycling the bromine-1,2-dibromotetrafluoroethane azeotrope into a reaction system whereby said bromine undergoes subsequent reaction with hexafluoroproylene to produce 1,2-dibromohexafluoropropane.

References Cited by the Examiner

UNITED STATES PATENTS

| | | | |
|---|---|---|---|
| 2,641,580 | 6/53 | Lewis | 252—67 |
| 2,757,212 | 7/56 | Cleaver et al. | 260—653 X |
| 2,999,817 | 9/61 | Bower | 252—67 X |
| 3,097,133 | 7/63 | Suckling et al. | 260—653 |
| 3,101,304 | 8/63 | Wüst. | |

NORMAN YUDKOFF, *Primary Examiner.*